(12) United States Patent
Ryu et al.

(10) Patent No.: US 11,683,713 B2
(45) Date of Patent: Jun. 20, 2023

(54) INTER-CELL DOWNLINK (DL) INTERFERENCE MEASUREMENT

(71) Applicant: QUALCOMM Incorporated, San Diego, CA (US)

(72) Inventors: Jung Ho Ryu, Fort Lee, NJ (US); Tao Luo, San Diego, CA (US); Junyi Li, Fairless Hills, PA (US); Danlu Zhang, Rancho Santa Fe, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 17/392,176

(22) Filed: Aug. 2, 2021

(65) Prior Publication Data

US 2023/0035449 A1 Feb. 2, 2023

(51) Int. Cl.
*H04W 24/10* (2009.01)
*H04B 17/336* (2015.01)
*H04B 7/06* (2006.01)
*H04L 5/00* (2006.01)

(52) U.S. Cl.
CPC .......... *H04W 24/10* (2013.01); *H04B 7/0626* (2013.01); *H04B 17/336* (2015.01); *H04L 5/006* (2013.01); *H04L 5/0051* (2013.01)

(58) Field of Classification Search
CPC ... H04W 24/10; H04B 7/0626; H04B 17/336; H04L 5/0051; H04L 5/006
See application file for complete search history.

(56) References Cited

U.S. PATENT DOCUMENTS

| 9,008,582 | B2 * | 4/2015 | Barbieri | H04B 7/0626 455/63.1 |
| 11,477,850 | B2 * | 10/2022 | Hwang | H04W 74/0833 |
| 2005/0111522 | A1 * | 5/2005 | Sung | H04J 11/0069 375/145 |
| 2010/0322227 | A1 * | 12/2010 | Luo | H04L 5/0094 455/500 |

(Continued)

FOREIGN PATENT DOCUMENTS

WO 2016148845 9/2016
WO WO-2022012396 A1 * 1/2022

OTHER PUBLICATIONS

Inter-cell Interference Mitigation and Coordination in CoMP Systems; Norshidah Katiran, Norsheila Fisal, Sharifah Kamilah Syed Yusof,Siti Marwangi Mohamad Maharum, Aimi Syamimi Ab Ghafar, (Year: 2011).*

(Continued)

*Primary Examiner* — Deepa Belur
(74) *Attorney, Agent, or Firm* — Seyfarth Shaw LLP

(57) ABSTRACT

A method for wireless communication performed by a user equipment (UE) includes receiving a reference signal (RS) configuration from a first base station. The RS configuration indicates an RS identifier (ID) of an RS associated with a second base station. The method also includes receiving the RS from the second base station based on receiving the RS configuration. The method further includes transmitting, to the first base station, an interference measurement report associated with receiving the RS from the second base station. The interference measurement report indicates the RS ID associated with the RS from the second base station.

30 Claims, 9 Drawing Sheets

(56) References Cited

U.S. PATENT DOCUMENTS

| | | | |
|---|---|---|---|
| 2012/0327800 A1 | 12/2012 | Kim et al. | |
| 2013/0303217 A1* | 11/2013 | Tao | H04B 7/024 455/501 |
| 2013/0308488 A1* | 11/2013 | Tong | H04B 7/0452 370/252 |
| 2015/0249517 A1 | 9/2015 | Seo et al. | |
| 2019/0363810 A1 | 11/2019 | Luo et al. | |
| 2020/0106589 A1* | 4/2020 | Xu | H04J 13/16 |
| 2020/0288339 A1* | 9/2020 | Zetterberg | H04W 24/10 |

OTHER PUBLICATIONS

International Search Report and Written Opinion—PCT/US2022/037190—ISA/EPO—dated Oct. 12, 2022.

* cited by examiner

500 →

502 — RECEIVING A REFERENCE SIGNAL (RS) CONFIGURATION FROM A FIRST BASE STATION, THE RS CONFIGURATION INDICATING AN RS IDENTIFIER (ID) OF AN RS ASSOCIATED WITH A SECOND BASE STATION

504 — RECEIVING THE RS FROM THE SECOND BASE STATION BASED ON RECEIVING THE RS CONFIGURATION

506 — TRANSMITTING, TO THE FIRST BASE STATION, AN INTERFERENCE MEASUREMENT REPORT ASSOCIATED WITH RECEIVING THE RS FROM THE SECOND BASE STATION, THE INTERFERENCE MEASUREMENT REPORT FURTHER INDICATING THE RS ID ASSOCIATED WITH THE RS FROM THE SECOND BASE STATION

*FIG. 5*

INTER-CELL DOWNLINK (DL) INTERFERENCE MEASUREMENT

FIELD OF THE DISCLOSURE

The present disclosure relates generally to wireless communications, and more specifically to inter-cell downlink (DL) interference measurement.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

In a wireless communication system, a UE may be located within the coverage of multiple base stations, where one of the base stations may be selected to serve the UE. The base station may be selected to serve the UE based on various criteria, such as received signal strength, received signal quality, or pathloss. In such examples, the received signal quality may be quantified as a signal-to-noise-plus-interference ratio (SINR), a carrier-to-interference ratio (C/I), or a reference signal received quality (RSRQ). Additionally, a quality of a downlink channel received at the UE may correspond to the SINR. In some examples, the base station serving the UE may increase signal power to improve the quality of the downlink channel. The signal power may vary over a range due to one or both of changes in a channel or UE movement.

In some examples, the UE may observe interference from one or more neighboring base stations. In such examples, the interference observed at the UE may change due to one or more reasons, such as one or both of changes in a channel or UE movement. In some examples, one or both of the base station serving the UE or the one or more neighboring base stations may adjust downlink channel parameters to mitigate the interference observed at the UE. In some such examples, the downlink channel parameters may be adjusted based on interference measurements.

SUMMARY

In one aspect of the present disclosure, a method for wireless communication by a UE is disclosed. The method includes receiving an RS configuration from a first base station serving the UE. The RS configuration indicates an RS ID of an RS associated with a second base station. The method further includes receiving the RS from the second base station based on the RS configuration. The method still further includes transmitting, to the first base station, an interference measurement report associated with receiving the RS from the second base station. The interference measurement report may indicate the RS ID associated with the RS received from the second base station.

Another aspect of the present disclosure is directed to an apparatus for wireless communication at a UE. The apparatus includes means for receiving an RS configuration from a first base station serving the UE. The RS configuration indicates an RS ID of an RS associated with a second base station. The apparatus further includes means for receiving the RS from the second base station based on the RS configuration. The apparatus still further includes means for transmitting, to the first base station, an interference measurement report associated with receiving the RS from the second base station. The interference measurement report may indicate the RS ID associated with the RS received from the second base station.

In another aspect of the present disclosure, a non-transitory computer-readable medium with non-transitory program code recorded thereon for wireless communication at a UE is disclosed. The program code is executed by a processor and includes program code to receive an RS configuration from a first base station serving the UE. The RS configuration indicates an RS ID of an RS associated with a second base station. The program code further includes program code to receive the RS from the second base station based on the RS configuration. The program code still further includes program code to transmit, to the first base station, an interference measurement report associated with receiving the RS from the second base station. The interference measurement report may indicate the RS ID associated with the RS received from the second base station.

Another aspect of the present disclosure is directed to an apparatus for wireless communication at a UE. The apparatus includes a processor, a memory coupled with the processor, and instructions stored in the memory and operable, when executed by the processor, to cause the apparatus to receive an RS configuration from a first base station serving the UE. The RS configuration indicates an RS ID of an RS associated with a second base station. Execution of the instructions further cause the apparatus to receive the RS from the second base station based on the RS configuration. Execution of the instructions also cause the apparatus to transmit, to the first base station, an interference measurement report associated with receiving the RS from the second base station. The interference measurement report may indicate the RS ID associated with the RS received from the second base station.

In one aspect of the present disclosure, a method for wireless communication by a base station is disclose. The method includes transmitting, to a UE, an RS configuration indicating an RS ID of an RS associated with a second base station. The method further includes receiving, from the UE, an interference measurement report associated with receiving the RS at the UE from the second base station based on transmitting the RS configuration. The interference measurement report may also indicate the RS ID associated with the RS. The method still further includes transmitting, to the second base station, the interference measurement report based on receiving the interference measurement report.

Another aspect of the present disclosure is directed to an apparatus for wireless communication at a base station. The apparatus includes means for transmitting, to a UE, an RS configuration indicating an RS ID of an RS associated with a second base station. The apparatus further includes means for receiving, from the UE, an interference measurement report associated with receiving the RS at the UE from the second base station based on transmitting the RS configuration. The interference measurement report may also indicate the RS ID associated with the RS. The apparatus still further includes means for transmitting, to the second base station, the interference measurement report based on receiving the interference measurement report.

In another aspect of the present disclosure, a non-transitory computer-readable medium with non-transitory program code recorded thereon for wireless communication at a base station is disclosed. The program code is executed by a processor and includes program code to transmit, to a UE, an RS configuration indicating an RS ID of an RS associated with a second base station. The program code further includes program code to receive, from the UE, an interference measurement report associated with receiving the RS at the UE from the second base station based on transmitting the RS configuration. The interference measurement report may also indicate the RS ID associated with the RS. The program code still further includes program code to transmit, to the second base station, the interference measurement report based on receiving the interference measurement report.

Another aspect of the present disclosure is directed to an apparatus for wireless communication at a base station. The apparatus includes a processor, a memory coupled with the processor, and instructions stored in the memory and operable, when executed by the processor, to cause the apparatus to transmit, to a UE, an RS configuration indicating an RS ID of an RS associated with a second base station. Execution of the instructions further cause the apparatus to receive, from the UE, an interference measurement report associated with receiving the RS at the UE from the second base station based on transmitting the RS configuration. The interference measurement report may also indicate the RS ID associated with the RS. Execution of the instructions also cause the apparatus to transmit, to the second base station, the interference measurement report based on receiving the interference measurement report.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 5 is a flow diagram illustrating an example process performed, for example, by a user equipment (UE), in accordance with various aspects of the present disclosure.

DETAILED DESCRIPTION

Figure 1:
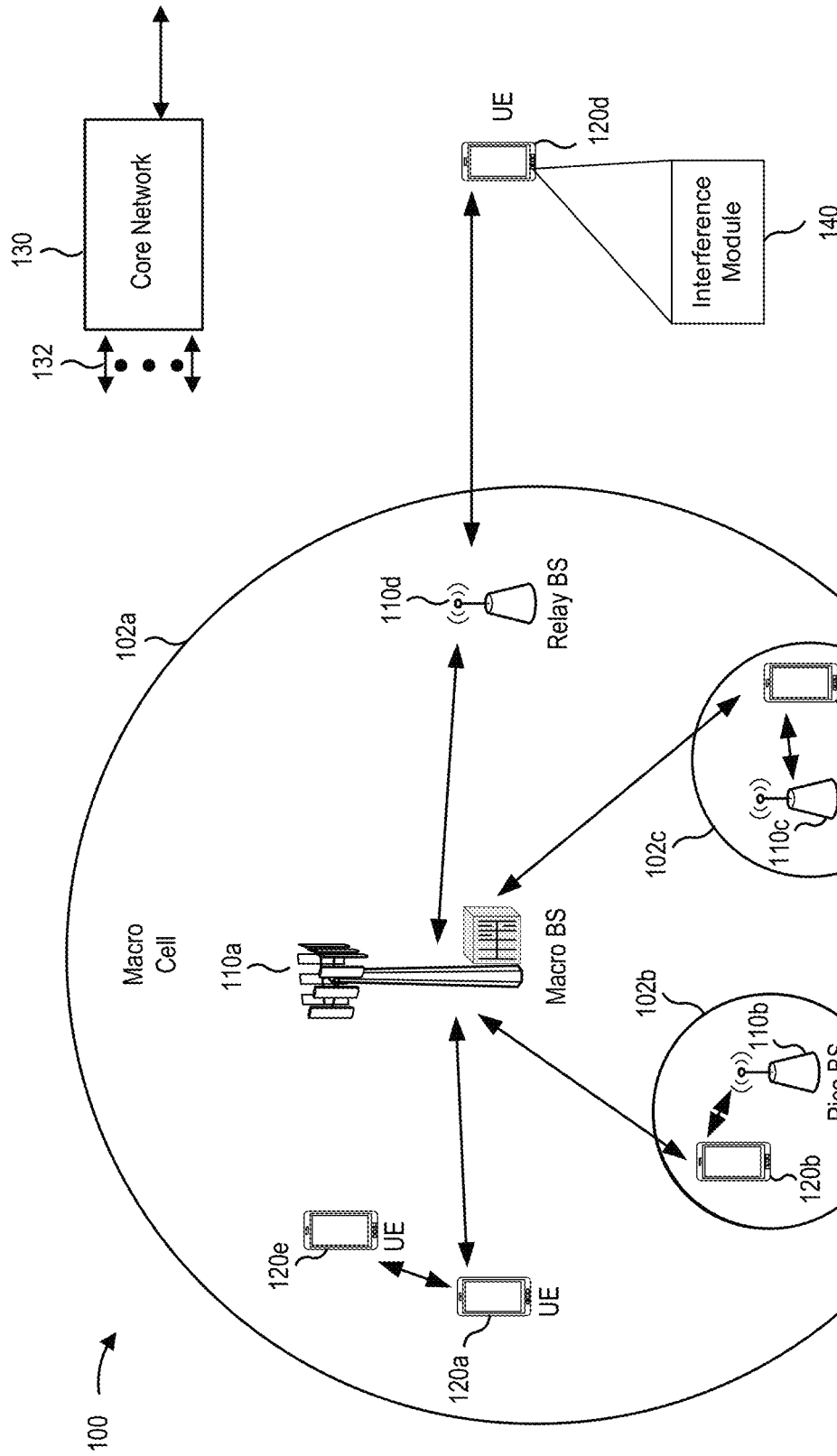
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G or 4G technologies.

As described, a UE may observe interference from one or more neighboring base stations. In such examples, the interference observed at the UE may change due to various reasons, such as changes in a channel or UE movement. In some examples, one or both of a base station serving the UE or the one or more neighboring base stations may adjust downlink channel parameters to mitigate the interference observed at the UE. In some examples, the downlink channel parameters may be adjusted based on the interference measurements.

Various aspects relate generally to a UE receiving a reference signal (RS) identifier (ID) of an RS associated with a neighboring base station, identifying the neighboring base station as a source of interference, such as inter-cell interference, based on receiving and measuring the RS associated with the RS ID, and coordinating with the neighboring base station to mitigate the interference based on identifying the neighboring base station as the source of the interference. Some aspects more specifically relate to a first UE receiving an RS configuration of a second base station from a first base station serving the first UE in a first frequency band. In such implementations, the RS configuration indicates an RS ID of an RS associated with the second base station serving a second UE in a second frequency band. In some examples, the second base station shares the RS configuration with the first base station over a backhaul connection. The RS ID may be a unique ID associated with the RS. In some examples, the RS ID may be, or may include, a scrambling ID of the RS associated with the second base station. In some examples, the RS may be a non-zero power (NZP) channel state information (CSI)

RS (NZP-CSI-RS). In some other examples, the RS may be a demodulation RS (DMRS). The first UE may receive the RS from the second base station based on receiving the RS configuration and perform measurements on the received RS. The UE may then transmit an interference measurement report to the first base station based on receiving and measuring the RS from the second base station. In some examples, the interference measurement report indicates the RS ID associated with the RS from the second base station. In some examples, the first base station may share the interference measurement report with the second base station. One or both of the first base station or the second base station may adjust one or more downlink parameters based on the interference measurement report. The one or more downlink parameters may be adjusted to mitigate interference experienced at the first UE.

Particular aspects of the subject matter described in this disclosure can be implemented to realize one or more of the following potential advantages. In some examples, interference, such as inter-cell interference, experienced at a UE may be mitigated based on the UE identifying and reporting a source of the interference experienced at the UE. By mitigating the interference, some aspects of the present disclosure may improve a quality of a channel between the UE and a serving base station.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B, an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, for example, macro BSs, pico BSs, femto BSs, relay BSs, and/or the like. These different types of BSs may have different transmit power levels, different coverage areas, and different impact on interference in the wireless network 100. For example, macro BSs may have a high transmit power level (for example, 5 to 40 Watts) whereas pico BSs, femto BSs, and relay BSs may have lower transmit power levels (for example, 0.1 to 2 Watts).

As an example, the BSs 110 (shown as BS 110a, BS 110b, BS 110c, and BS 110d) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include an interference module 140. For brevity, only one UE 120d is shown as including the interference module 140. The interference module 140 may receive, from a first base station 110 (for example, BS 110a, BS 110b, BS 110c, or BS 110d), an RS configuration indicating an RS ID of an RS associated with a second base station 110 (for example, BS 110a, BS 110b, BS 110c, or BS 110d). In some examples, the first base station 110 serves the first UE 120 in a first frequency band and the second base station 110 serves a second UE 120 in a second frequency band. The interference module 140 may also receiving the RS from the second base station 110 based on receiving the RS configuration. The interference module 140 may further transmit, to the first base station 110, an interference measurement report associated with the RS from the second base station 110, the interference measurement report may further indicates the RS ID associated with the RS from the second base station 110.

The core network 130 or the base stations 110 may include an interference module 138 for transmitting, to a first UE 120, an RS configuration indicating a first RS ID of a first RS associated with a second base station 110. In some examples, the first base station 110 serves the first UE 120 in a first frequency band and the second base station 110 serves a second UE 120 in a second frequency band. The interference module 138 may also receive, from the first UE 120, a first interference measurement report associated with receiving the first RS at the first UE 120 from the second base station 110 based on transmitting the RS configuration. In some examples, the interference measurement report further indicates the first RS ID associated with the first RS. The interference module 138 may further transmit, to the second base station 110, the first interference measurement report based on receiving the first interference measurement report.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (for example, remote device), or some other entity. A wireless node may provide, for example, connectivity for or to a network (for example, a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

As indicated above, FIG. 1 is provided merely as an example. Other examples may differ from what is described with regard to FIG. 1.

Figure 2:
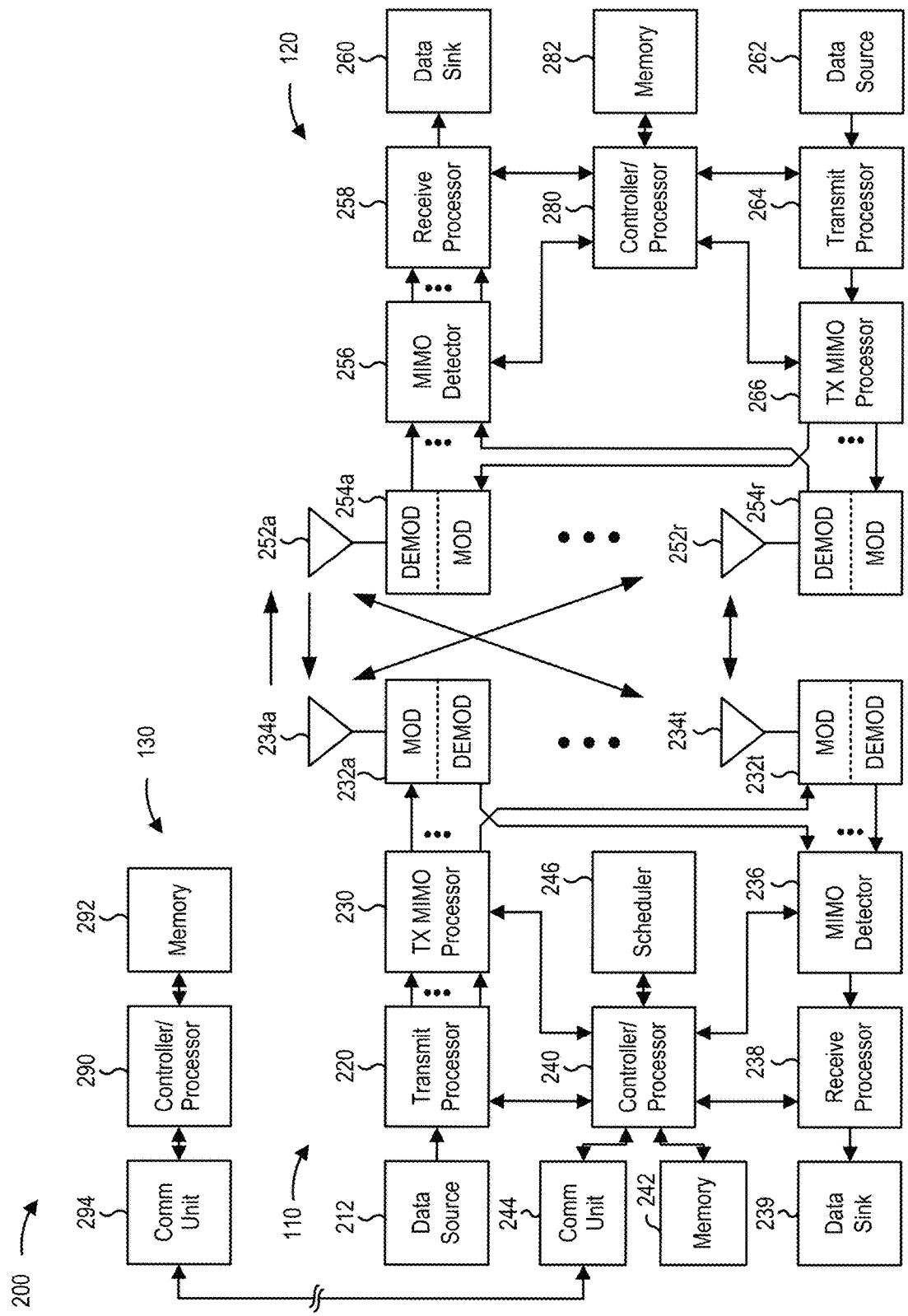
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232a through 232t. Each modulator 232 may process a respective output symbol stream (for example, for OFDM and/or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with measuring inter-cell interference and identifying a source of the inter-cell interference, as described in more detail elsewhere. For example, the controller/processor 240 of the base station 110, the controller/processor 280 of the UE 120, and/or any other component(s) of FIG. 2 may perform or direct operations of, for example, the processes of FIGS. 5 and 7 and/or other processes as described. Memories 242 and 282 may store data and program codes for the base station 110 and UE 120, respectively. A scheduler 246 may schedule UEs for data transmission on the downlink and/or uplink.

As described, a UE may observe interference from one or more neighboring base stations. In such examples, the interference observed at the UE may change due to various reasons, such as changes in a channel or UE movement. In some examples, one or both of a base station serving the UE or the one or more neighboring base stations may adjust downlink channel parameters to mitigate the interference observed at the UE. In some examples, the downlink channel parameters may be adjusted based on interference measurements, such as an SINR estimate. In some conventional systems, the interference may be measured based on an average interference. Still, such measurements may provide inaccurate information for predicting downlink performance in a current slot. Aspects of the present disclosure are directed to improving accuracy of interference measurements, such as SINR estimates. In some implementations, downlink performance in the current slot may be predicated based on the interference measurements. Additionally, downlink performance may be improved based on one or more downlink parameters that may be adjusted based on the interference measurements.

Figure 3A:
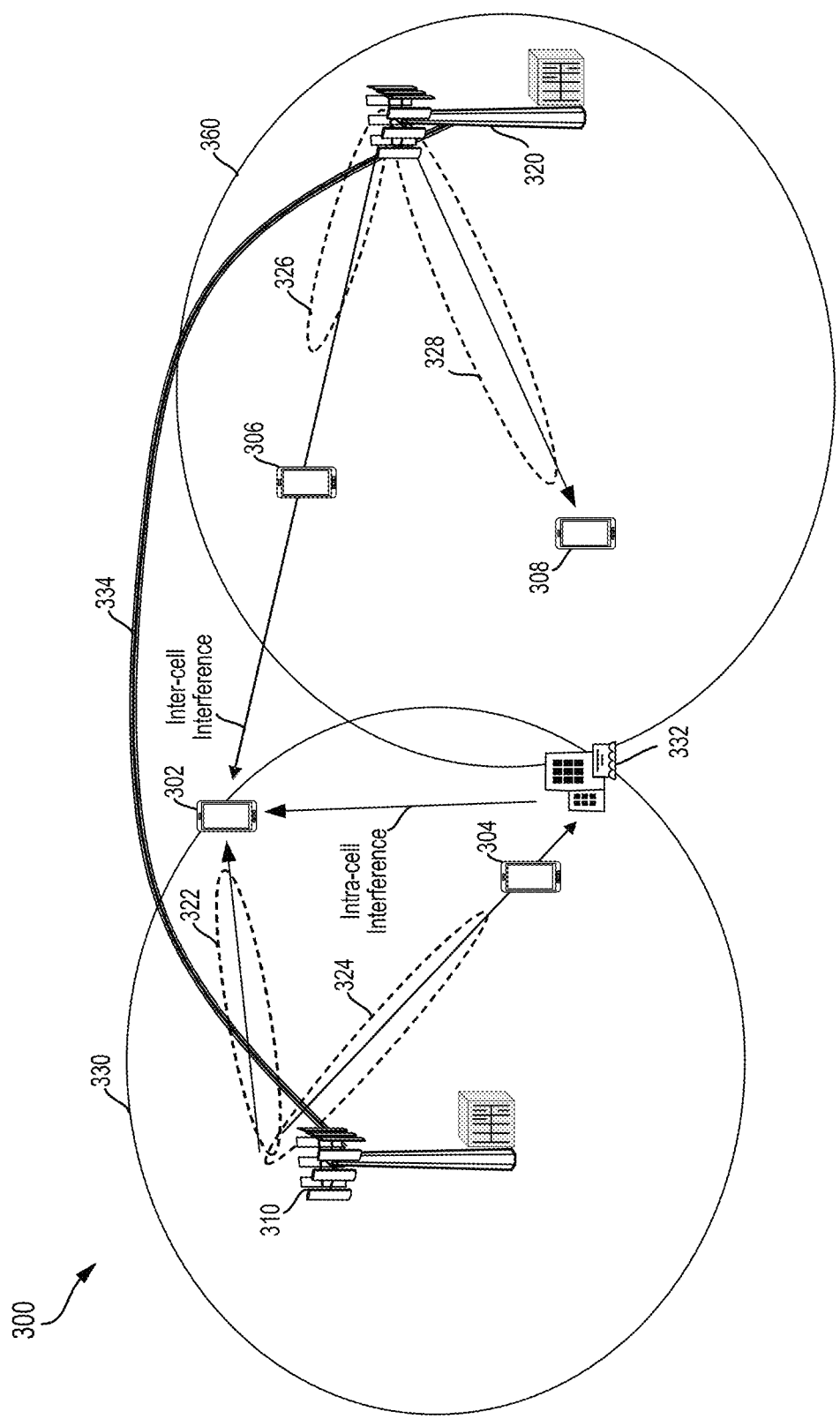
FIG. 3A is a block diagram illustrating a wireless communications network using backhaul for base station coordination, in accordance with aspects of the present disclosure.

FIG. 3A is a block diagram illustrating a wireless communications network 300, in accordance with aspects of the present disclosure. As shown in FIG. 3, the wireless network 300 includes cells 330 and 360. A first cell 330 includes a first base station 310, serving a first UE 302 and a third UE 304. Additionally, a second cell 360 includes a second base station 320, serving a second UE 306 and a fourth UE 308. In the example of FIG. 3A, the UEs 302, 304, 306, and 308 may be examples of the UE 120 described with reference to FIGS. 1 and 2. Additionally, the base stations 310 and 320 may be examples of the base station 110 described with reference to FIGS. 1 and 2. As shown in the example of FIG. 3A, the first base station 310 sends transmissions to the first UE 302 on a first frequency band 322 and also sends transmissions to the third UE 304 on a second frequency band 324. Additionally, the second base station 320 sends transmissions to the second UE 306 on a third frequency band 326 and also sends transmissions to the fourth UE 308 on a fourth frequency band 328. Each of the frequency bands 322, 324, 326, and 328 may be the same frequency band as one or more of the other the frequency bands 322, 324, 326, and 328 or different from the other the frequency bands 322, 324, 326, and 328. Additionally, the first base station 310 and the second base station 320 may coordinate with each other over a backhaul connection 334.

In the example of FIG. 3A, the third UE 304 and first UE 302 may experience intra-cell interference due to transmissions from the first base station 310 to the third UE 304 on the second frequency band 324. As an example, the signal from the first base station 310 to the third UE 304 on second frequency band 324 may reflect off of a reflector 332, such as a building or another reflective environmental object. In such an example, the reflection of the second frequency band 324 signal toward the first UE 302 may cause the first UE 302 to experience intra-cell interference. Additionally, the first UE 302 may experience inter-cell interference based on transmission from the second base station 320 to the second UE 306 on the third frequency band 326. In some examples, downlink transmissions from the second base station 320 to the second UE 306 on the third frequency band 326 may interfere with uplink transmissions from the first UE 302 to the first base station 310.

In some conventional wireless systems, the first base station 310 may allocate CSI-interference measurement (CSI-IM) resources to the first UE 302 to measure the inter-cell interference. As an example, after allocating the CSI-IM resources, the first base station 310 may provide a measurement gap by refraining from performing downlink transmissions during the measurement gap. In such an example, the first UE 302 may measure background interference during the measurement gap. Still, in this example, the first UE 302 may not be able to identify a source of the inter-cell interference.

According to aspects of the present disclosure, the first UE 302 may determine the source of inter-cell interference, and the first base station 310 may coordinate with the source of the inter-cell interference to mitigate the inter-cell interference. Based on aspects of the present disclosure, the first UE 302 may determine that the inter-cell interference may be the transmissions of the second base station 320 on the third frequency band 326. In such an example, the first base station 310 and the second base station 320 may coordinate downlink scheduling to mitigate the inter-cell interference. In some examples, the second base station 320 and the first base station 310 may coordinate downlink transmissions to occur in different slots to mitigate the inter-cell interference.

In some examples, a UE may receive one or more parameters to identify a source of interference experienced at the UE. The one or more parameters may be associated with downlink signals of a neighboring base station. In some conventional systems, the UE measures a synchronization signal block (SSB) from the neighboring base station. Still, SSB measurements may not provide accurate interference measurements because the neighboring base station may not use the SSBs for transmissions to UEs served by the neighboring base station. Therefore, in some implementations, the UE may measure a non-zero power (NZP) CSI reference signal (RS) from the neighboring base station.

Figure 3B:
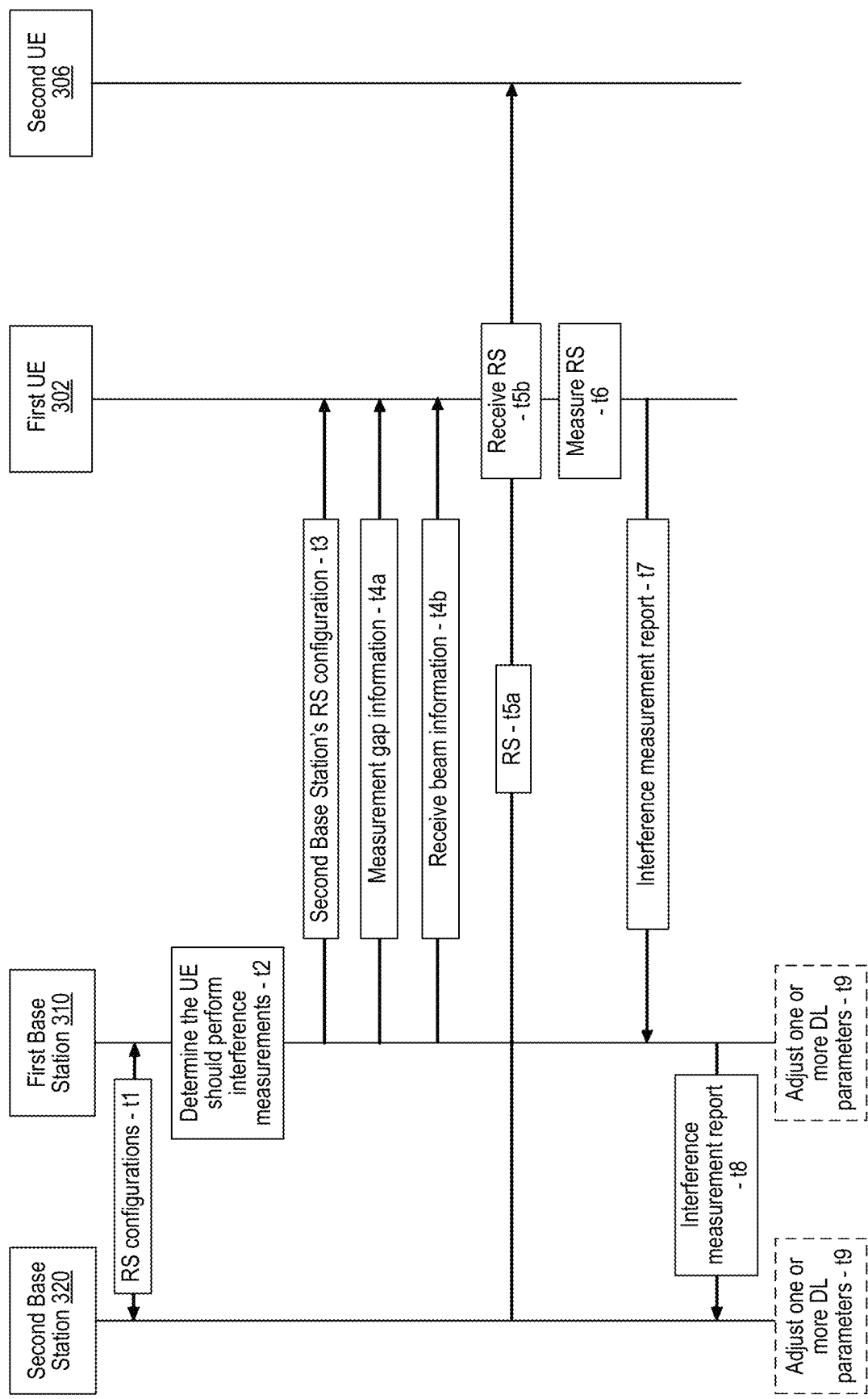
FIGS. 3B and 3C are timing diagrams illustrating examples of a UE measuring a reference signal transmitted by a neighboring base station, in accordance with aspects of the present disclosure.

FIG. 3B is a timing diagram illustrating an example of a UE measuring a reference signal transmitted by a neighboring base station, in accordance with aspects of the present disclosure. In the example of FIG. 3B, the UEs 302 and 306 may be examples of the UE 120 described with reference to FIGS. 1 and 2. Additionally, the base stations 310 and 320 may be examples of the base station 110 described with reference to FIGS. 1 and 2. In the example of FIG. 3B, the first base station 310 serves the first UE 302 and the second base station 320 serves the second UE 306, as described with reference to FIG. 3A.

As shown in FIG. 3B, at time t1, the base stations 310 and 320 share RS configurations with each other. As an example, the first base station 310 shares its RS configuration with the second base station 320, and vice versa. In some examples, the RS configurations may be non-zero power (NZP) CSI-RS (NZP-CSI-RS) configurations. The RS configurations may be shared on a backhaul connection, such as the backhaul connection 334 described with reference to FIG. 3A. In contrast to a CSI-IM, for the NZP-CSI-RS, a base station may transmit one or more of a pilot signal having a waveform that depends on a scrambling ID, a slot index, and a symbol index. In some implementations, the RS configuration information shared at time t1 may include one or more of bandwidth part (BWP) information, time or frequency domain resource allocation information, power control information, periodicity and offset information, and scrambling ID information.

Additionally, at time t2, the first base station 310 may determine that a served UE (for example, the first UE 302) should measure interference, such as inter-cell interference, and identify a source of the interference. In some examples, the first base station 310 may determine that the served UE should measure the inter-cell interference and identify the source of the inter-cell interference based on one or more of a number of negative acknowledgments (NACKs) received from the first UE 302 satisfying a measurement condition or current channel conditions. The number of NACKs received from the first UE 302 may satisfy the measurement condition based on the number of NACKs being equal to or greater than a NACK threshold. At time t3, the first base station 310 may transmit the second base station's RS configuration to the first UE 302 based on determining the first UE 302 should measure the inter-cell interference and identify the source of the inter-cell interference. As shown in FIG. 3B, the first base station 310 obtains the second base station's RS configuration at time t1. In some implementations, the second base station's RS configuration may indicate an RS ID of the RS associated with the second base station's RS configuration. In some examples, the RS ID may be a scrambling ID associated with the RS or may include the scrambling ID associated with the RS. In some other examples, the RS ID may include one or more unique identifiers of the RS. The one or more unique identifiers may include one or more parameters of the RS configuration.

In some implementations, at time t4a, the first base station 310 transmits measurement gap information to the first UE 302. The measurement gap information may indicate a measurement gap for the first UE 302 to measure interference based on the RS (for example, the NZP-CSI-RS) transmitted by the second base station 320. In some examples, during the measurement gap, the first UE 302 may not communicate with the first base station 310 because the first UE 302 is expected to perform inter-frequency or inter-system measurements. In conventional systems, a measurement gap, such as a synchronization signal block (SSB)-based measurement timing configuration (SMTC), may be pre-configured, such that the first UE 302 may measure the second base station's synchronization signal or physical broadcast channel (PBCH). In some other implementations, the first UE 302 may be instructed to measure the second base station's RS without a measurement gap. Additionally, or alternatively, at time t4b, the first base station 310 may transmit a message including receive beam information, where the receive beam information indicates a receive beam that the first UE 302 should use when measuring the second base station's RS.

As shown in FIG. 3B, at time t5a, the second base station 320 transmits an RS, such as the NZP-CSI-RS, to the second UE 306. Additionally, at time t5b, the first UE 302 may receive the RS transmitted by the second base station 320 at time t5a based on the second base station's RS configuration transmitted by the first base station 310 at time t3. Although not shown in FIG. 3B, the second UE 306 may also receive the RS transmitted at time t5a. At time t6, the first UE 302 measures the RS transmitted by the second base station 320 based on receiving the RS at time t5b. Additionally, at time t7, the first UE 302 may transmit an interference measurement report to the first base station 310 based on receiving the RS at time t5a and measuring the RS at time t6. In some examples, the interference measurement report may also indicate the RS ID associated with the RS received at time t5b and measured at time t6. As described, the RS ID is, or may include, the scrambling ID of the RS received at time t5b and measured at time t6. Additionally, the RS measurement report may also indicate other measurement information. For example, the RS measurement report may indicate one or more of a measured interference power, scrambling ID associated with the RS, time or frequency domain resources used to measure the RS, or the receive beam used to measure the RS.

As shown in FIG. 3B, at time t8, the first base station 310 may share the interference measurement report with the second base station 320. In some implementations, at time t9, one or both of the first base station 310 or the second base station 320 may adjust one or more DL parameters based on the interference measurement report transmitted by the first UE 302. The first base station 310 or the second base station 320 may adjust the one or more DL parameters to mitigate (for example, reduce) interference, such as inter-cell interference, experienced at the first UE 302. The first base station 310 is not limited to sharing one interference measurement report. In some examples, the first base station 310 may share multiple interference measurement reports received from one or more UEs served by the first base station 310.

Although not shown in FIG. 3B, in some implementations, the second base station 320 may share one or more interference measurement reports with the first base station 310. The one or more interference measurement reports shared by the second base station 320 may be received from one or more UEs served by the second base station 320, such as the second UE 306 or the fourth UE 308 described with reference to FIG. 3A. In some such implementations, the first base station 310 or the second base station 320 may adjust the one or more DL parameters based on one or both of interference measurement reports shared by the first base station 310 or interference measurement reports shared by the second base station 320. In such implementations, the base stations 310 and 320 may share the interference measurement reports with each other to improve interference coordination and management.

Figure 3C:
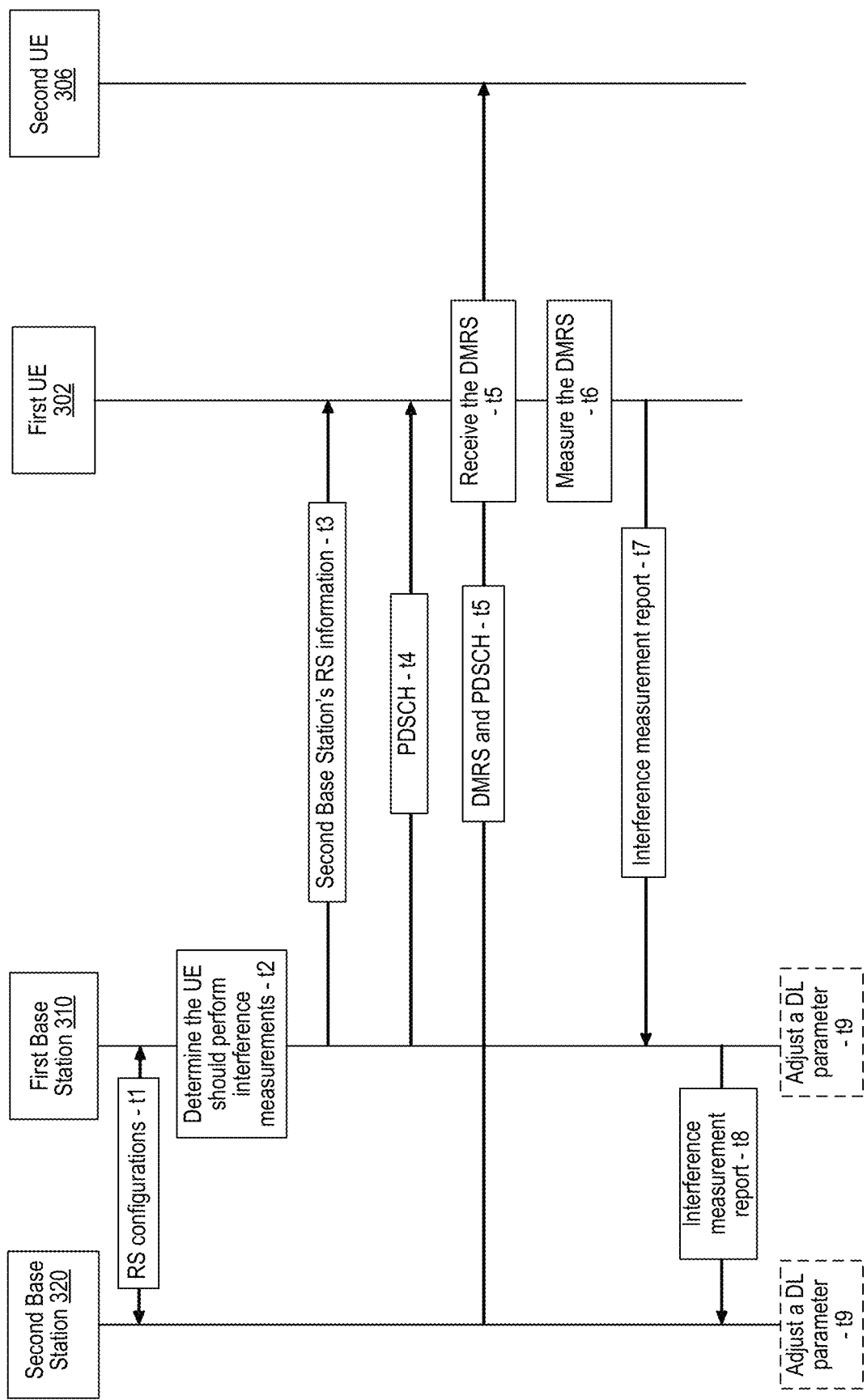

In some other implementations, the UE may measure another type of RS, such as a DMRS. FIG. 3C is a timing diagram illustrating an example of a UE measuring a reference signal transmitted by a neighboring base station, in accordance with aspects of the present disclosure. In the example of FIG. 3C, the UEs 302 and 306 may be examples of the UE 120 described with reference to FIGS. 1 and 2. Additionally, the base stations 310 and 320 may be examples of the base station 110 described with reference to FIGS. 1 and 2. In the example of FIG. 3C, the first base station 310 serves the first UE 302 and the second base station 320 serves the second UE 306, as described with reference to FIG. 3A.

As shown in FIG. 3C, at time t1, the base stations 310 and 320 share RS configurations with each other. In some examples, the RS configurations shared at time t1 may be DMRS configurations. The RS configurations may be shared on a backhaul connection, such as the backhaul connection 334 described with reference to FIG. 3A. In some implementations, the RS configuration information shared at time t1 may include one or more of DMRS configuration information (for example, Type 1 or 2 DMRS), a code division multiplexing (CDM) group associated with the RS, a symbol index associated with the RS, a scrambling ID associated with the RS, or a maximum length associated with the RS.

Additionally, at time t2, the first base station 310 may determine that a served UE (for example, the first UE 302) should measure interference, such as inter-cell interference, and identify a source of interference. In some examples, the first base station 310 may determine that the served UE should measure the inter-cell interference and identify the source of the inter-cell interference based on one or more of a number of NACKs received from the first UE 302 satisfying a measurement condition or current channel conditions. At time t3, the first base station 310 may transmit the second base station's RS configuration to the first UE 302 based on determining the first UE 302 should measure the inter-cell interference and identify the source of the inter-cell interference. In some implementations, the second base station's RS configuration may indicate an RS ID associated with the RS corresponding to the second base station's RS configuration. In some examples, the RS ID may be a scrambling ID associated with the RS or may include the scrambling ID associated with the RS. In some other examples, the RS ID may be one or more unique identifiers of the RS, such as one or more parameters of the RS configuration.

In some examples, a DMRS may be transmitted with a physical downlink shared channel (PDSCH) for channel estimation. In such examples, the DMRS may be used for the inter-cell interference measurement. In the example of FIG. 3C, at time t4, the first base station 310 may transmit a PDSCH to the first UE 302. Additionally, at time t5, the second base station 320 may transmit another PDSCH to the second UE 306 in the same slot as the PDSCH transmitted by the first base station 310. In such examples, one or more DMRSs may be transmitted with each PDSCH transmission (t4 and t5). In this example, at time t5, the first UE 302 may receive the RS (for example, DMRS) transmitted with the PDSCH associated with the second base station 320 based on receiving the PDSCH associated with the first base station 310 at time t4. In some examples, the first UE 302 may be triggered to search for the DMRS transmitted with the PDSCH associated with the second base station 320 based on receiving the PDSCH associated with the first base station 310 at time t4. Although not shown in FIG. 3C, the second UE 306 may also receive the DMRS transmitted with the PDSCH at time t5.

At time t6, the first UE 302 measures the DMRS associated with the second base station 320 based on receiving the DMRS at time t5. Additionally, at time t7, the first UE 302 may transmit, to the first base station 310, an interference measurement report associated with the DMRS received at time t5 and measured at time t6. In some examples, the interference measurement report may also indicate the RS ID associated with the RS received at time t5 and measured at time t6. As described, the RS ID is, or may include, the scrambling ID of the RS received at time t5b and measured at time t6. Additionally, the RS measurement report may indicate a result associated with the RS measurement. For example, the RS measurement report may indicate one or more of a measured interference power, a scrambling ID associated with the DMRS, time or frequency domain resources used to measure the DMRS, or the receive beam used to measure the DMRS. The example of FIG. 3C is not limited to a DMRS. Other types of RSs are contemplated.

As shown in FIG. 3C, at time t8, the first base station 310 may share the interference measurement report with the second base station 320. In some implementations, at time t9, one or both of the first base station 310 or the second base station 320 may adjust one or more DL parameters based on the interference measurement report transmitted by the first UE 302. The first base station 310 or the second base station 320 may adjust the one or more DL parameters to mitigate (for example, reduce) interference, such as inter-cell interference, experienced at the first UE 302. The first base station 310 is not limited to sharing one interference measurement report. In some examples, the first base station 310 may share multiple interference measurement reports.

Although not shown in FIG. 3C, in some implementations, the second base station 320 may share one or more interference measurement reports with the first base station 310. The one or more interference measurement reports shared by the second base station 320 may be received from one or more UEs served by the second base station 320, such as the second UE 306 or the fourth UE 308 described with reference to FIG. 3A. In some such implementations, the first base station 310 or the second base station 320 may adjust the one or more DL parameters based on one or both of interference measurement reports shared by the first base station 310 or interference measurement reports shared by the second base station 320. In such implementations, the base stations 310 and 320 may share the interference measurement reports with each other to improve interference coordination and management.

Figure 4:
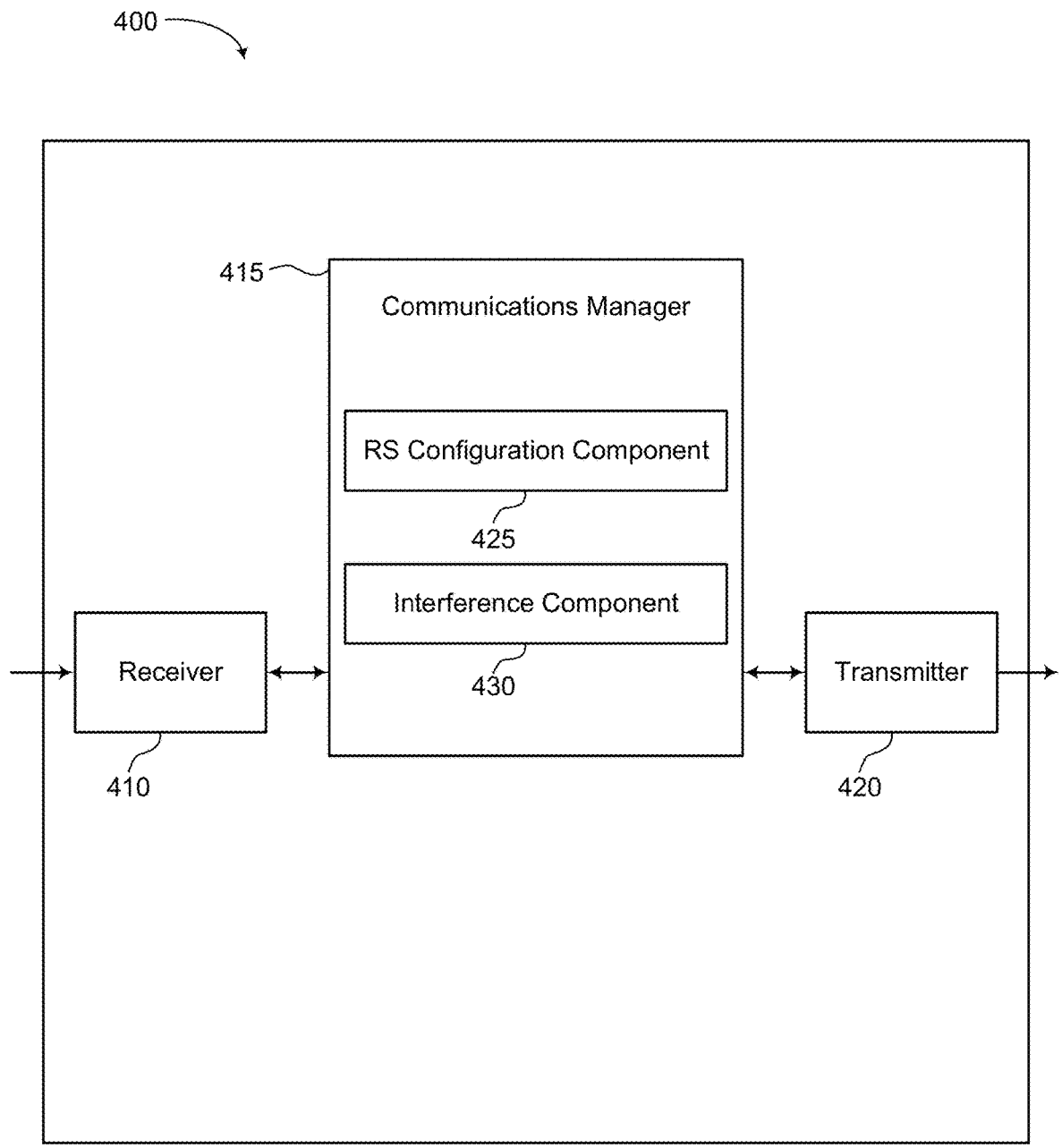
FIG. 4 is a block diagram of a wireless communication device that measures inter-cell interference and identifies a source of the inter-cell interference, in accordance with aspects of the present disclosure.

FIG. 4 is a block diagram of a wireless communication device 400 that measures inter-cell interference and identifies a source of the inter-cell interference, in accordance with aspects of the present disclosure, in accordance with aspects of the present disclosure. The wireless communication device 400 may be an example of aspects of a UE 120, 302, 304, 306, and 308, described with reference to FIGS. 1, 2, 3A, 3B, and 3C, respectively. The wireless communication device 400 may include a receiver 410, a communications manager 415, and a transmitter 420, which may be in communication with one another (for example, via one or more buses). In some implementations, the receiver 410 and the transmitter 420 may operate in conjunction with an RS configuration component 425 and an interference component 430. In some examples, the wireless communication device 400 is configured to perform operations, including operations of the process 500 described below with reference to FIG. 5.

In some examples, the wireless communication device 400 can include a chip, system on chip (SoC), chipset, package, or device that includes at least one processor and at least one modem (for example, a 5G modem or other cellular modem). In some examples, the communications manager 415, or its sub-components, may be separate and distinct components. In some examples, at least some components of the communications manager 415 are implemented at least in part as software stored in a memory. For example, portions of one or more of the components of the communications manager 415 can be implemented as non-transitory code executable by the processor to perform the functions or operations of the respective component.

The receiver 410 may receive one or more reference signals (for example, periodically configured CSI-RSs, aperiodically configured CSI-RSs, or multi-beam-specific reference signals), synchronization signals (for example, synchronization signal blocks (SSBs)), control information, and/or data information, such as in the form of packets, from one or more other wireless communication devices via various channels including control channels (for example, a physical downlink control channel (PDCCH) and data channels (for example, a physical downlink shared channel (PDSCH)). The other wireless communication devices may include, but are not limited to, another UE 120 or a base station 110, described with reference to FIGS. 1 and 2.

The received information may be passed on to other components of the wireless communication device 400. The receiver 410 may be an example of aspects of the receive processor 258 described with reference to FIG. 2. The receiver 410 may include a set of radio frequency (RF) chains that are coupled with or otherwise utilize a set of antennas (for example, the set of antennas may be an example of aspects of the antennas 252a through 252r described with reference to FIG. 2).

The transmitter 420 may transmit signals generated by the communications manager 415 or other components of the wireless communication device 400. In some examples, the transmitter 420 may be collocated with the receiver 410 in a transceiver. The transmitter 420 may be an example of aspects of the transmit processor 264 described with reference to FIG. 2. The transmitter 420 may be coupled with or otherwise utilize a set of antennas (for example, the set of antennas may be an example of aspects of the antennas 252a through 252r described with reference to FIG. 2), which may be antenna elements shared with the receiver 410. In some examples, the transmitter 420 is configured to transmit control information in a physical uplink control channel (PUCCH) and data in a physical uplink shared channel (PUSCH).

The communications manager 415 may be an example of aspects of the controller/processor 280 described with reference to FIG. 2. The communications manager 415 includes the RS configuration component 425 and the interference component 430. In some examples, the RS configuration component 425 may work in conjunction with the receiver 410 to receive an RS configuration from a first base station serving the UE. The RS configuration may indicate an RS ID of an RS associated with a second base station. Additionally, the interference component 430 may work in conjunction with the receiver 410 to receive the RS from the second base station based on the RS configuration. The interference component 430 may also work in conjunction with the transmitter 420 to transmit, to the first base station, an interference measurement report associated with receiving the RS from the second base station. In some examples, the interference measurement report further indicates the RS ID associated with the RS from the second base station. The RS ID may be, or may include, a scrambling ID of the RS.

FIG. 5 is a flow diagram illustrating an example process 500 performed, for example, by a UE, in accordance with various aspects of the present disclosure. The example process 500 is an example of measuring inter-cell interference and identifying a source of the inter-cell interference. The operations of the process 500 may be implemented by a UE, such as a UE 120, 302, 304, 306, and 308, or its components, described with reference to FIGS. 1, 2, 3A, 3B, 3C, and 4. For example, operations of the process 500 may be performed by one or more of an RS configuration component 425 or an interference component 430 as described with reference to FIG. 4. In some examples, a UE may execute a set of instructions to control the functional elements of the UE to perform the operations or functions described below. Additionally, or alternatively, a UE may perform aspects of the operations or functions described below using special-purpose hardware.

As shown in FIG. 5, the process 500 begins at block 502 by receiving an RS configuration from a first base station serving the UE. The RS configuration may indicate an RS ID of an RS associated with a second base station. At block 504, the process 500 receives the RS from the second base station based on the RS configuration. At block 506, the process 500 transmits, to the first base station, an interference measurement report associated with receiving the RS from the second base station. In some examples, the interference measurement report further indicates the RS ID associated with the RS from the second base station. The RS ID may be, or may include, a scrambling ID of the RS.

Figure 6:
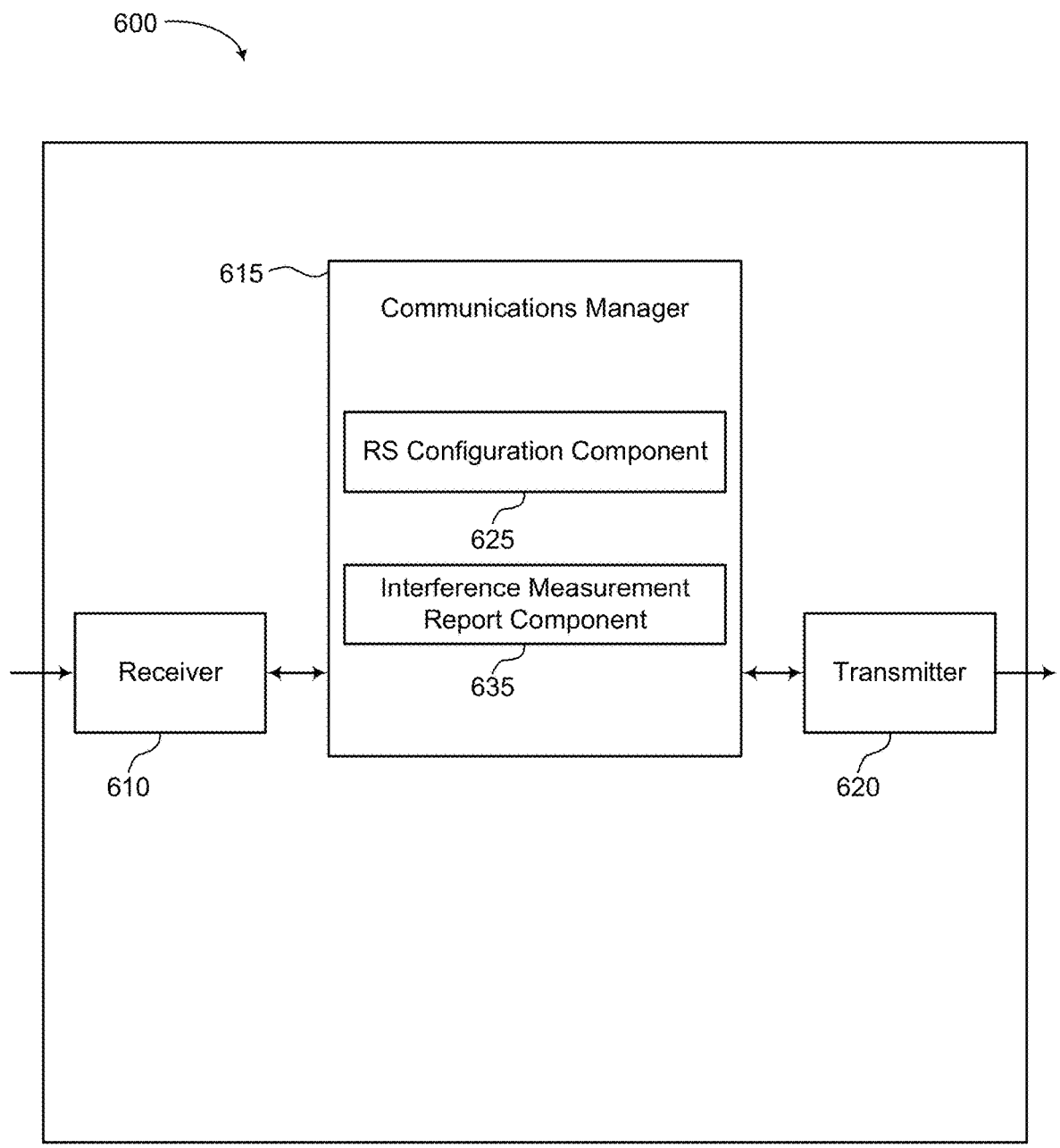
FIG. 6 is a block diagram of a wireless communication device that coordinates inter-cell interference measurements, in accordance with aspects of the present disclosure.

FIG. 6 is a block diagram of a wireless communication device 600 that coordinates inter-cell interference measurements, in accordance with aspects of the present disclosure. The wireless communication device 600 may be an example of aspects of a base station 110, 310, and 320, described with reference to FIGS. 1, 2, 3A, 3B, and 3C, respectively. The wireless communication device 600 may include a receiver 610, a communications manager 615, and a transmitter 620, which may be in communication with one another (for example, via one or more buses). In some examples, the wireless communication device 600 is configured to perform operations, including operations of the process 700 described below with reference to FIG. 7.

In some examples, the wireless communication device 600 can include a chip, system on chip (SoC), chipset, package, or device that includes at least one processor and at least one modem (for example, a 5G modem or other cellular modem). In some examples, the communications manager 615, or its sub-components, may be separate and distinct components. In some examples, at least some components of the communications manager 615 are implemented at least in part as software stored in a memory. For example, portions of one or more of the components of the communications manager 615 can be implemented as non-transitory code executable by the processor to perform the functions or operations of the respective component.

The receiver 610 may receive one or more reference signals (for example, periodically configured CSI-RSs, aperiodically configured CSI-RSs, or multi-beam-specific reference signals), synchronization signals (for example, synchronization signal blocks (SSBs)), control information, and/or data information, such as in the form of packets, from one or more other wireless communication devices via various channels including control channels (for example, a PDCCH) and data channels (for example, a PDSCH). The other wireless communication devices may include, but are not limited to, another base station 110 or a UE 120, described with reference to FIGS. 1 and 2.

The received information may be passed on to other components of the wireless communication device 600. The receiver 610 may be an example of aspects of the receive processor 238 described with reference to FIG. 2. The receiver 610 may include a set of radio frequency (RF) chains that are coupled with or otherwise utilize a set of antennas (for example, the set of antennas may be an example of aspects of the antennas 234a through 234t described with reference to FIG. 2).

The transmitter 620 may transmit signals generated by the communications manager 615 or other components of the wireless communication device 600. In some examples, the transmitter 620 may be collocated with the receiver 610 in a transceiver. The transmitter 620 may be an example of aspects of the transmit processor 220 described with reference to FIG. 2. The transmitter 620 may be coupled with or otherwise utilize a set of antennas (for example, the set of antennas may be an example of aspects of the antennas 234a through 234t), which may be antenna elements shared with the receiver 610. In some examples, the transmitter 620 is configured to transmit control information in a physical uplink control channel (PUCCH) and data in a physical uplink shared channel (PUSCH).

The communications manager 615 may be an example of aspects of the controller/processor 240 described with reference to FIG. 2. The communications manager 615 includes an RS configuration component 625 and an interference measurement report component 635. In some examples, the RS configuration component 625 may work in conjunction with the transmitter 620 to transmit, to a UE, an RS configuration indicating an RS ID of an RS associated with a second base station. Additionally, the interference measurement report component 635 may work in conjunction with the receiver 610 to receive, from the UE, an interference measurement report associated with receiving the RS at the UE from the second base station based on transmitting the RS configuration. The interference measurement report may also indicate the RS ID associated with the RS. The interference measurement report component 635 may also work in conjunction with the transmitter 620 to transmit to the second base station, the interference measurement report based on receiving the interference measurement report.

Figure 7:
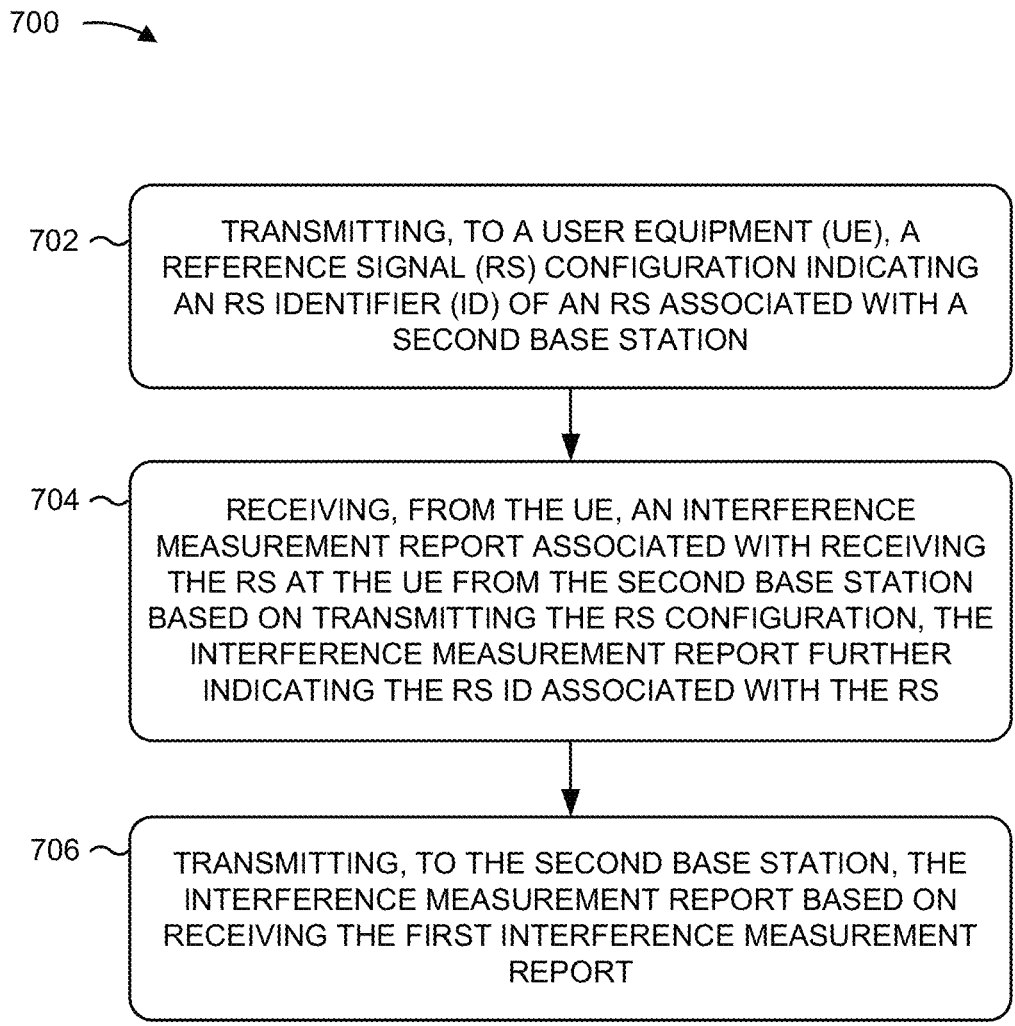
FIG. 7 is a flow diagram illustrating an example process performed, for example, by a base station, in accordance with various aspects of the present disclosure.

FIG. 7 is a flow diagram illustrating an example process 700 performed, for example, by a base station, in accordance with various aspects of the present disclosure. The example process 700 is an example of measuring inter-cell interference and identifying a source of the inter-cell interference. The operations of the process 700 may be implemented by a base station, such as a base station 110, 310, and 320, or its components, described with reference to FIGS. 1, 2, 3A, 3B, 3C, and 6. For example, operations of the process 700 may be performed by one or more of an RS configuration component 625 or an interference measurement report component 635 as described with reference to FIG. 6. In some examples, a base station may execute a set of instructions to control the functional elements of the base station to perform the operations or functions described below. Additionally, or alternatively, base station UE may perform aspects of the operations or functions described below using special-purpose hardware.

As shown in FIG. 7, the process 700 begins at block 702 by transmitting, to a UE, an RS configuration indicating an RS ID of an RS associated with a second base station. At block 704, the process 700 receives, from the UE, an interference measurement report associated with receiving the RS at the UE from the second base station based on transmitting the RS configuration. The interference measurement report may also indicate the RS ID associated with the RS. At block 706, the process 700 transmits, to the second base station, the interference measurement report based on receiving the interference measurement report.

The following provides an overview of some Aspects of the present disclosure:

Aspect 1. A method for wireless communication performed by a first UE, comprising: receiving an RS configuration from a first base station serving the first UE, the RS configuration indicating an RS ID of an RS associated with a second base station; receiving the RS from the second base station based on the RS configuration; and transmitting, to the first base station, an interference measurement report associated with receiving the RS from the second base station, the interference measurement report further indicating the RS ID associated with the RS from the second base station.

Aspect 2. The method of Aspect 1, wherein the RS ID is or includes a scrambling ID.

Aspect 3. The method of any one of Aspects 1-2, wherein the RS is an NZP-CSI-RS.

Aspect 4. The method of any one of Aspects 1-3, wherein the RS configuration further indicates one or more of bandwidth part information associated with the RS, time and frequency domain resource allocation information associated with the RS, power control information associated with the RS, or periodicity and offset information associated with the RS.

Aspect 5. The method of any one of Aspects 1-4, further comprising receiving, from the first base station, a measurement gap configuration indicating a measurement gap for measuring the RS, wherein the interference measurement report is based on measuring the RS during the measurement gap.

Aspect 6. The method of any one of Aspects 1-5, further comprising receiving, from the first base station, a receive beam configuration indicating a receive beam for measuring the RS, wherein the interference measurement report is based on measuring the RS on the receive beam.

Aspect 7. The method of Aspect 1, wherein the RS is a DMRS.

Aspect 8. The method of Aspect 7, wherein the RS configuration further indicates one or more of a DMRS type associated with the RS, a CDM group associated with the RS, a symbol index associated with the RS, or a maximum length associated with the RS.

Aspect 9. The method of any one of Aspects 7-8, further comprising receiving, from the first base station, a first PDSCH, wherein the RS is received on a second PDSCH associated with the second base station based on receiving the first PDSCH.

Aspect 10. The method of any one of Aspects 1-9, wherein the interference measurement report indicates one or more of a measured interference power associated with the RS, time and frequency domain resources associated with the RS, or a receive beam associated with the RS.

Aspect 11. The method of any one of Aspects 1-10, wherein the first base station serves the first UE in a first frequency band and the second base station serves the second UE in a second frequency band.

Aspect 12. A method for wireless communication performed by a first base station, comprising: transmitting, to a first UE, an RS configuration indicating a first RS ID of a first RS associated with a second base station; receiving, from the first UE, a first interference measurement report associated with receiving the first RS at the first UE from the second base station based on transmitting the RS configuration, the first interference measurement report further indicating the first RS ID associated with the first RS; and transmitting, to the second base station, the first interference measurement report based on receiving the first interference measurement report.

Aspect 13. The method of Aspect 12, wherein the first RS ID is or includes a scrambling ID.

Aspect 14. The method of any one of Aspects 12-13, wherein the first RS is an NZP-CSI-RS.

Aspect 15. The method of any one of Aspects 12-14, wherein the RS configuration further indicates one or more of bandwidth part information associated with the first RS, time and frequency domain resource allocation information associated with the first RS, power control information associated with the first RS, or periodicity and offset information associated with the first RS.

Aspect 16. The method of any one of Aspects 12-15, further comprising transmitting, to the first UE, a measurement gap configuration indicating a measurement gap for measuring the first RS.

Aspect 17. The method of any one of Aspects 12-16, further comprising transmitting, to the first UE, a receive beam configuration indicating a receive beam for measuring the first RS.

Aspect 18. The method of Aspect 12, wherein the first RS is a DMRS.

Aspect 19. The method of Aspect 18, wherein the RS configuration further indicates one or more of a DMRS type associated with the first RS, a CDM group associated with the first RS, a symbol index associated with the first RS, or a maximum length associated with the first RS.

Aspect 20. The method of any one of Aspects 12-19, wherein the first interference measurement report indicates one or more of a measured interference power associated with the first RS, time and frequency domain resources associated with the first RS, or a receive beam associated with the first RS.

Aspect 21. The method of any one of Aspects 12-20, further comprising adjusting one or more of a time resource or a frequency resource associated with a downlink transmission to the first UE based on receiving the first interference measurement report.

Aspect 22. The method of any one of Aspects 12-21, further comprising: receiving, from the second base station, a second interference measurement report associated with receiving a second RS at the second UE from the first base station, the second interference measurement report further indicating a second RS ID associated with the second RS; and adjusting one or more of a time resource or a frequency resource associated with a downlink transmission to the first UE based on receiving one or both of the first interference measurement report and the second interference measurement report.

Aspect 23. The method of any one of Aspects 12-22, wherein the first base station serves the first UE in a first frequency band and the second base station serves the second UE in a second frequency band.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication performed by a first user equipment (UE), comprising:
   receiving a reference signal (RS) configuration from a first base station serving the first UE, the RS configuration indicating an RS identifier (ID) of an RS associated with a second base station;
   receiving the RS from the second base station based on the RS configuration; and
   transmitting, to the first base station, an interference measurement report associated with receiving the RS from the second base station, the interference measurement report further indicating the RS ID associated with the RS from the second base station.

2. The method of claim 1, wherein the RS ID is or includes a scrambling ID.

3. The method of claim 1, wherein the RS is a non-zero power (NZP) channel state information (CSI) RS.

4. The method of claim 1, wherein the RS configuration further indicates one or more of bandwidth part information associated with the RS, time and frequency domain resource allocation information associated with the RS, power control information associated with the RS, or periodicity and offset information associated with the RS.

5. The method of claim 1, further comprising receiving, from the first base station, a measurement gap configuration indicating a measurement gap for measuring the RS, wherein the interference measurement report is based on measuring the RS during the measurement gap.

6. The method of claim 1, further comprising receiving, from the first base station, a receive beam configuration indicating a receive beam for measuring the RS, wherein the interference measurement report is based on measuring the RS on the receive beam.

7. The method of claim 1, wherein the RS is a demodulation RS (DMRS).

8. The method of claim 7, wherein the RS configuration further indicates one or more of a DMRS type associated with the RS, a code division multiplexing (CDM) group associated with the RS, a symbol index associated with the RS, or a maximum length associated with the RS.

9. The method of claim 7, further comprising receiving, from the first base station, a first physical downlink shared channel (PDSCH), wherein the RS is received on a second PDSCH associated with the second base station based on receiving the first PDSCH.

10. The method of claim 1, wherein the interference measurement report indicates one or more of a measured interference power associated with the RS, time and frequency domain resources associated with the RS, or a receive beam associated with the RS.

11. The method of claim 1, wherein the first base station serves the first UE in a first frequency band and the second base station serves a second UE in a second frequency band.

12. An apparatus for wireless communications at a user equipment (UE), comprising:
one or more processors;
one or more memories coupled with the one or more processors; and
one or more instructions stored in the one or more memories and operable, when executed by the one or more processors individually or collectively, to cause the apparatus to:
receive a reference signal (RS) configuration from a first base station serving the first UE, the RS configuration indicating an RS identifier (ID) of an RS associated with a second base station;
receive the RS from the second base station based on the RS configuration; and
transmit, to the first base station, an interference measurement report associated with receiving the RS from the second base station, the interference measurement report further indicating the RS ID associated with the RS from the second base station.

13. The apparatus of claim 12, wherein:
the RS ID is or includes a scrambling ID; and
the RS is a non-zero power (NZP) channel state information (CSI) RS or a demodulation RS (DMRS).

14. The apparatus of claim 12, wherein the RS configuration further indicates one or more of bandwidth part information associated with the RS, time and frequency domain resource allocation information associated with the RS, power control information associated with the RS, or periodicity and offset information associated with the RS.

15. A method for wireless communication performed by a first base station, comprising:
transmitting, to a first user equipment (UE), a reference signal (RS) configuration indicating a first RS identifier (ID) of a first RS associated with a second base station;
receiving, from the first UE, a first interference measurement report associated with receiving the first RS at the first UE from the second base station based on transmitting the RS configuration, the first interference measurement report further indicating the first RS ID associated with the first RS; and
transmitting, to the second base station, the first interference measurement report based on receiving the first interference measurement report.

16. The method of claim 15, wherein the first RS ID is or includes a scrambling ID.

17. The method of claim 15, wherein the first RS is a non-zero power (NZP) channel state information (CSI) RS.

18. The method of claim 15, wherein the RS configuration further indicates one or more of bandwidth part information associated with the first RS, time and frequency domain resource allocation information associated with the first RS, power control information associated with the first RS, or periodicity and offset information associated with the first RS.

19. The method of claim 15, further comprising transmitting, to the first UE, a measurement gap configuration indicating a measurement gap for measuring the first RS.

20. The method of claim 15, further comprising transmitting, to the first UE, a receive beam configuration indicating a receive beam for measuring the first RS.

21. The method of claim 15, wherein the first RS is a demodulation RS (DMRS).

22. The method of claim 21, wherein the RS configuration further indicates one or more of a DMRS type associated with the first RS, a code division multiplexing (CDM) group associated with the first RS, a symbol index associated with the first RS, or a maximum length associated with the first RS.

23. The method of claim 15, wherein the first interference measurement report indicates one or more of a measured interference power associated with the first RS, time and frequency domain resources associated with the first RS, or a receive beam associated with the first RS.

24. The method of claim 15, further comprising adjusting one or more of a time resource or a frequency resource associated with a downlink transmission to the first UE based on receiving the first interference measurement report.

25. The method of claim 15, further comprising:
receiving, from the second base station, a second interference measurement report associated with receiving a second RS at a second UE from the first base station, the second interference measurement report further indicating a second RS ID associated with the second RS; and
adjusting one or more of a time resource or a frequency resource associated with a downlink transmission to the first UE based on receiving one or both of the first interference measurement report and the second interference measurement report.

26. The method of claim 15, wherein the first base station serves the first UE in a first frequency band and the second base station serves a second UE in a second frequency band.

27. An apparatus for wireless communications at a first base station, comprising:
one or more processors;
one or more memories coupled with the one or more processors; and
one or more instructions stored in the one or more memories and operable, when executed by the one or more processors individually or collectively, to cause the apparatus to:
transmit, to a first user equipment (UE), a reference signal (RS) configuration indicating a first RS identifier (ID) of a first RS associated with a second base station;
receive, from the first UE, a first interference measurement report associated with receiving the first RS at the first UE from the second base station based on transmitting the RS configuration, the first interference measurement report further indicating the first RS ID associated with the first RS; and
transmit, to the second base station, the first interference measurement report based on receiving the first interference measurement report.

28. The apparatus of claim 27, wherein the first RS ID is or includes a scrambling ID.

29. The apparatus of claim 27, wherein the first RS is a non-zero power (NZP) channel state information (CSI) RS or a demodulation RS (DMRS).

30. The apparatus of claim 27, wherein the RS configuration further indicates one or more of bandwidth part information associated with the first RS, time and frequency domain resource allocation information associated with the first RS, power control information associated with the first RS, or periodicity and offset information associated with the first RS.

* * * * *